US008654183B2

United States Patent
Jung et al.

(10) Patent No.: US 8,654,183 B2
(45) Date of Patent: Feb. 18, 2014

(54) SYSTEM FOR AND METHOD FOR EVALUATING CROSSTALK OF STEREOSCOPIC IMAGE DISPLAY

(75) Inventors: Sungmin Jung, Incheon (KR); Seungchul Lee, Paju-si (KR); Youngbok Lee, Goyang-si (KR); Hyungju Park, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 495 days.

(21) Appl. No.: 13/077,465

(22) Filed: Mar. 31, 2011

(65) Prior Publication Data

US 2012/0050498 A1    Mar. 1, 2012

(30) Foreign Application Priority Data

Aug. 24, 2010    (KR) .................. 10-2010-0081921

(51) Int. Cl.
*H04N 13/04*    (2006.01)
(52) U.S. Cl.
USPC ............................................................ 348/51
(58) Field of Classification Search
USPC ............................................................ 348/51
See application file for complete search history.

(56) References Cited

FOREIGN PATENT DOCUMENTS

| GB | 2 404 106 A | 1/2005 |
| GB | 2485244 A | 5/2012 |

OTHER PUBLICATIONS

Pan, Cheng Cheng; "Crosstalk Evaluation of Shutter Type Stereoscopic Display" SID '10, pp. 128-131.*
Jung et al., "High image quality 3D displays with polarizer glasses based on active retarder technology", SPIE-IS&T, vol. 7863, 2011, pp. 78630L-1 to 78630L-8.
Jung et al., "P-11: Improvement of 3-D Crosstalk with Over-Driving Method for the Active Retarder 3-D Displays", SID 10 Digest, 2010, pp. 1264, XP-002594623.
Liou et al., "Shutter Glasses Stereo LCD with a Dynamic Backlight", SPIE-IS&T, 2009, vol. 7237, pp. 72370X-1 to 72370X-8.
Pan et al., "10.3 Cross-Talk Evaluation of Shutter-Type Stereoscopic 3D Display", SID 10 Digest, 2010, pp. 128, XP-002694621.
Shestak et al., "10.4 Measuring of Gray-to-Gray Crosstalk in a LCD Based Time-Sequential Stereoscopic Display", SID 10 Digest, 2010, pp. 132, XP-002694622.

(Continued)

*Primary Examiner* — Sath V Perungavoor
*Assistant Examiner* — Jeffery Williams
(74) *Attorney, Agent, or Firm* — Birch, Stewart, Kolasch & Birch, LLP

(57) ABSTRACT

A system and a method for evaluating a crosstalk of a stereoscopic image display are discussed. The crosstalk evaluation system according to an embodiment includes a display element that alternately display left and right eye images each having an i-gray level and a j-gray level, where "i" and "j" are an integer, a luminance meter sensing luminances of the left and right eye images displayed on the display element, and a computer that calculates a 3D crosstalk at the i-gray level of the left eye image affected by the j-gray level of the right eye image and a 3D crosstalk at the i-gray level of the right eye image affected by the j-gray level of the left eye image based on a luminance information received from the luminance meter while changing the i-gray level and the j-gray level.

6 Claims, 8 Drawing Sheets

(56) References Cited

OTHER PUBLICATIONS

Shestak et al., "Measurement of Gray-to-Gray Crosstalk in Stereoscopic Displays", IMID/IDMC/ASIA Display 2010 Digest, 2010, 47-3, pp. 332-333.

Tsai et al., "Evaluation of Gray to Gray Performance in Stereoscopic Displays", IDW '10, 2010, pp. 1295-1298.

Woods, "How are Crosstalk and Ghosting defined in the Stereoscopic Literature?", SPIE-IS&T, 2011, vol. 7863, pp. 78630Z-1 to 78630Z-8.

Woods, "Understanding Crosstalk in Stereoscopic Displays", 3DSA (Three-Dimensional Systems and Applications) conference, Tokyo, Japan, May 19-21, 2010, 11 pages.

* cited by examiner

SYSTEM FOR AND METHOD FOR EVALUATING CROSSTALK OF STEREOSCOPIC IMAGE DISPLAY

This application claims the benefit of Korea Patent Application No. 10-2010-0081921 filed on Aug. 24, 2010, the entire contents of which is incorporated herein by reference for all purposes as if fully set forth herein.

BACKGROUND OF THE INVENTION

1. Field of the Invention

Embodiments of the invention relate to a system and a method for evaluating a crosstalk of a stereoscopic image display.

2. Discussion of the Related Art

A stereoscopic image display is classified into a display using a stereoscopic technique and a display using an autostereoscopic technique.

The stereoscopic technique, which uses a parallax image between left and right eyes of a user with a high stereoscopic effect, includes a glasses type method and a non-glasses type method. In the glasses type method, the parallax image between the left and right eyes is displayed on a direct-view display or a projector through a change in a polarization direction of the left and right parallax image or in a time-division manner, and thus a stereoscopic image is implemented using polarization glasses or shutter glasses. In the non-glasses type method, an optical axis of the parallax image between the left and right eyes is separated generally using an optical plate such as a parallax barrier and a lenticular lens, and thus the stereoscopic image is implemented.

A glasses type stereoscopic image display generally displays a left eye image and a right eye image on a display panel in a time division manner. Glasses the user wears include a left eye filter (or a left eye shutter) for transmitting light of the left eye image and a right eye filter (or a right eye shutter) for transmitting light of the right eye image. Thus, the user may view only the left eye image during odd-numbered frame periods and may view only the right eye image during even-numbered frame periods, thereby feeling a stereoscopic feeling through the stereoscopic technique.

The user, that views a stereoscopic image through the glasses type stereoscopic image display, may perceive a 3D crosstalk, in which the user views doubled image by leaking part of the left eye image into the right eye image and vice versa. There is a ghosting phenomenon as an example of the 3D crosstalk. In the ghosting phenomenon, because a gray level of a current left eye image or a current right eye image is affected by a gray level of a previous left eye image or a previous right eye image that has been previously displayed on the display panel, the current left/right eye image is reproduced at a gray level different from an original gray level of the current left/right eye image.

The 3D crosstalk is generally generated because a gray level of one (for example, a left eye image) of left and right eye images is affected by a gray level of the other image (for example, the right eye image) and is reproduced at a gray level different from an original gray level of the one image. The existing method for evaluating the 3D crosstalk was implemented by quantifying the ghosting phenomenon. For this, the stereoscopic image display alternately displayed the left and right eye images each having a black gray level and a white gray level, and luminances of the left and right eye images passing through the left eye filter and the right eye filter of the glasses were measured by a luminance meter. The 3D crosstalk was evaluated using an algorithm for measuring an increasing level of the back gray level of the left eye image affected by the white gray level of the right eye image based on the luminance of the left eye image measured by the luminance meter and an algorithm for measuring an increasing level of the back gray level of the right eye image affected by the white gray level of the left eye image based on the luminance of the right eye image measured by the luminance meter.

In the method for evaluating the 3D crosstalk, the crosstalk evaluation algorism of the left eye image is expressed by the following Equation (1):

$$CTL_{B,W} = \frac{L_{BW} - L_{BB}}{L_{WB} - L_{BB}} \times 100[\%] \quad (1)$$

where $CTL_{B,W}$ is the 3D crosstalk at the black gray level of the left eye image affected by the white gray level of the right eye image, $L_{BW}$ is a luminance when the black gray level of the left eye image is greater than a desired black gray level because of an influence of the white gray level of the right eye image, and $L_{WB}$ is a luminance when the white gray level of the left eye image is less than a desired white gray level because of an influence of the black gray level of the right eye image.

Further, in the method for evaluating the 3D crosstalk, the crosstalk evaluation algorism of the right eye image is expressed by the following Equation (2):

$$CTR_{B,W} = \frac{R_{BW} - R_{BB}}{R_{WB} - R_{BB}} \times 100[\%] \quad (2)$$

where $CTR_{B,W}$ is the 3D crosstalk at the black gray level of the right eye image affected by the white gray level of the left eye image, $R_{BW}$ is a luminance when the black gray level of the right eye image is greater than a desired black gray level because of an influence of the white gray level of the left eye image, and $R_{WB}$ is a luminance when the white gray level of the right eye image is less than a desired white gray level because of an influence of the black gray level of the left eye image.

In the existing method for evaluating the 3D crosstalk, the 3D crosstalk between the left and right eye images each having only the white gray level and the black gray level was evaluated, and the 3D crosstalk between the left and right eye images having other gray levels was evaluated using an approximation method. However, the stereoscopic image display displays not only images having the white gray level and the black gray level but also images having $2^n$ gray levels, where n is a bitrate of pixel data of an input image. Thus, because the existing method for evaluating the 3D crosstalk does not consider the real use environments of the stereoscopic image display, the 3D crosstalk at each of all of representable gray levels of the stereoscopic image display cannot be accurately evaluated.

SUMMARY OF THE INVENTION

Embodiments of the invention provide a system and a method for evaluating a crosstalk of a stereoscopic image display capable of accurately and rapidly measuring a 3D crosstalk at each of all of representable gray levels.

In one aspect, there is a crosstalk evaluation system of a stereoscopic image display comprising a display element configured to alternately display left and right eye images each having an i-gray level and a j-gray level, where "i" and "j" are an integer, a luminance meter configured to sense luminances of the left and right eye images displayed on the display element, and a computer configured to calculate a 3D crosstalk at the i-gray level of the left eye image affected by the j-gray level of the right eye image and a 3D crosstalk at the i-gray level of the right eye image affected by the j-gray level of the left eye image based on a luminance information received from the luminance meter while changing the i-gray level and the j-gray level.

Further, the 3D crosstalk at the i-gray level of the left eye image affected by the j-gray level of the right eye image and the 3D crosstalk at the i-gray level of the right eye image affected by the j-gray level of the left eye image are calculated based on the following Equations:

$$CTL_{i,j} = \left|\frac{L_{i,j} - L_{i,i}}{L_{j,i} - L_{i,i}}\right| \times 100[\%],$$

$$CTR_{i,j} = \left|\frac{R_{i,j} - R_{i,i}}{R_{j,i} - R_{i,i}}\right| \times 100[\%]$$

where $CTL_{i,j}$ is the 3D crosstalk at the i-gray level of the left eye image affected by the j-gray level of the right eye image, $L_{i,j}$ is a luminance at the i-gray level of the left eye image affected by the j-gray level of the right eye image, $L_{j,i}$ is a luminance at the j-gray level of the left eye image affected by the i-gray level of the right eye image, $CTR_{i,j}$ is the 3D crosstalk at the i-gray level of the right eye image affected by the j-gray level of the left eye image, $R_{i,j}$ is a luminance at the i-gray level of the right eye image affected by the j-gray level of the left eye image, and $R_{j,i}$ is a luminance at the j-gray level of the right eye image affected by the i-gray level of the left eye image.

A left eye filter or a right eye filter of shutter glasses or polarization glasses is disposed in front of a light incident unit of the luminance meter.

The crosstalk evaluation system further comprises a straight guide unit configured to move the luminance meter by a distance between both eyes of a user in front of the display element, and a power supply unit configured to drive the straight guide unit.

In another aspect, there is a method for evaluating a crosstalk of a stereoscopic image display comprising alternately displaying left and right eye images each having an i-gray level and a j-gray level on a display element, where "i" and "j" are an integer, sensing luminances of the left and right eye images displayed on the display element using a luminance meter disposed in front of the display element, and calculating a 3D crosstalk at the i-gray level of the left eye image affected by the j-gray level of the right eye image and a 3D crosstalk at the i-gray level of the right eye image affected by the j-gray level of the left eye image based on a luminance information received from the luminance meter while changing the i-gray level and the j-gray level.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
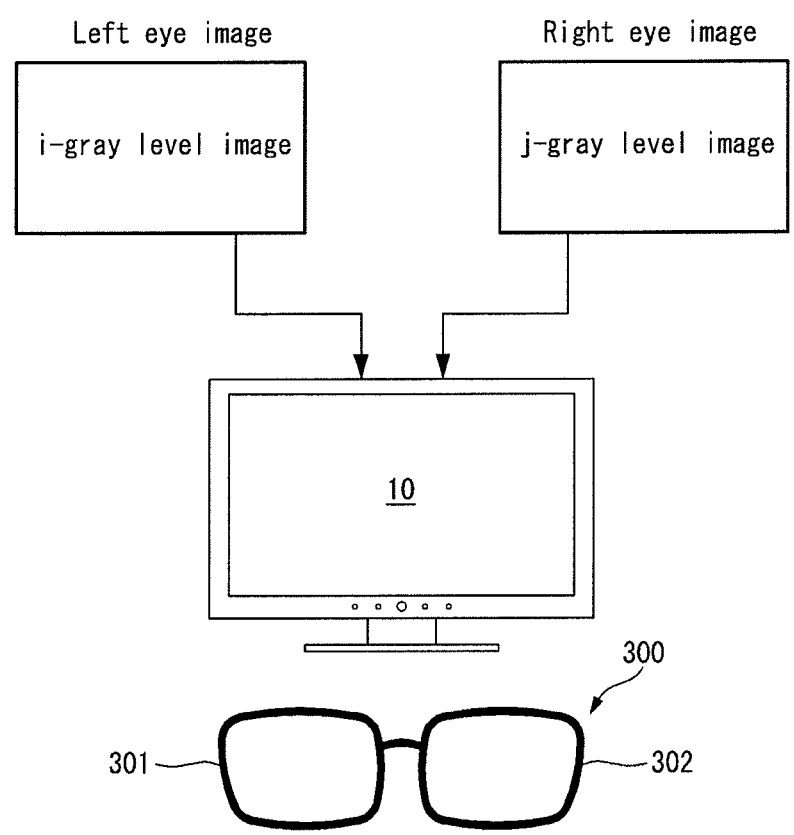
FIG. 1 illustrates a glasses type stereoscopic image display according to an exemplary embodiment of the invention.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

A system and a method for evaluating a crosstalk of a stereoscopic image display according to an exemplary embodiment of the invention evaluate a 3D crosstalk of a glasses type stereoscopic image display or a non-glasses type stereoscopic image display at each of all of representable gray levels thereof. A display element of the stereoscopic image display may be implemented by display elements of a liquid crystal display (LCD), a field emission display (FED), a plasma display panel (PDP), an electroluminescence device (EL) including an inorganic electroluminescence device and an organic light emitting diode (OLED), and an electrophoretic display (EPD). Other display elements may be used. The display element includes data lines to which a data signal is supplied, scan lines (or gate lines), crossing the data lines, to which a scan pulse (or a gate pulse) is sequentially supplied, and pixels arranged in a matrix form.

FIG. 1 illustrates a glasses type stereoscopic image display according to an exemplary embodiment of the invention.

As shown in FIG. 1, data of a left eye image and data of a right eye image are displayed on a display element 10 in a time division manner. For example, the left eye image data or the right eye image data is addressed to the display element 10 during odd-numbered frame periods, and the right eye image data or the left eye image data, that is different from the data addressed during the odd-numbered frame periods, is addressed to the display element 10 during even-numbered frame periods. In each of the pixels of the display element 10, the left/right eye image data is written during an Nth frame period, and the right/left eye image data, that is different from the data written during the Nth frame period, is written during an (N+1)th frame period, where N is a natural number. Thus, a gray level of a current left/right eye image a user views is affected by previous right/left eye image data, that has been previously written to the same pixel as the current left/right eye image and is different from current left/right eye image data, and a luminance at the gray level of the current left/right eye image is greater or less than a desired luminance. As a result, the user feels the 3D crosstalk such as a ghosting phenomenon.

Figure 2:
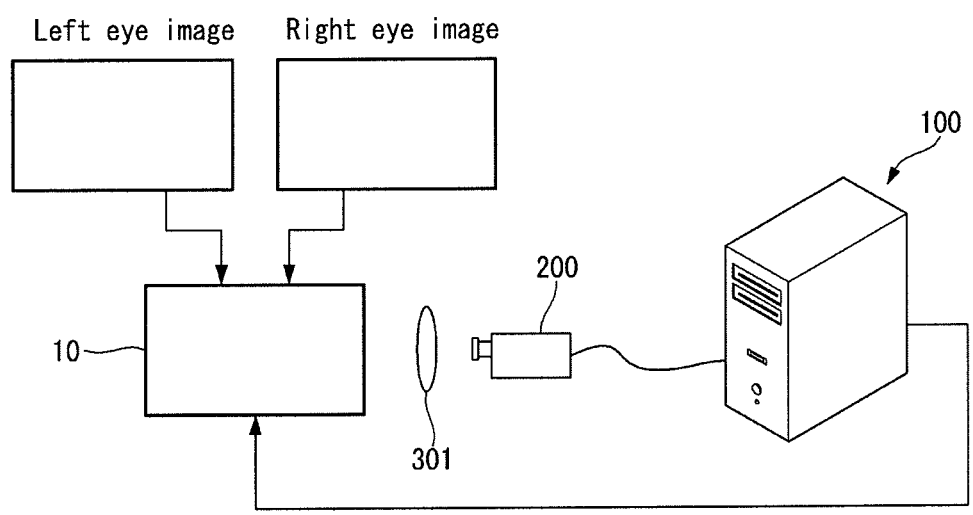
FIG. 2 schematically illustrates a crosstalk evaluation system of a stereoscopic image display according to an exemplary embodiment of the invention.
Figure 3:
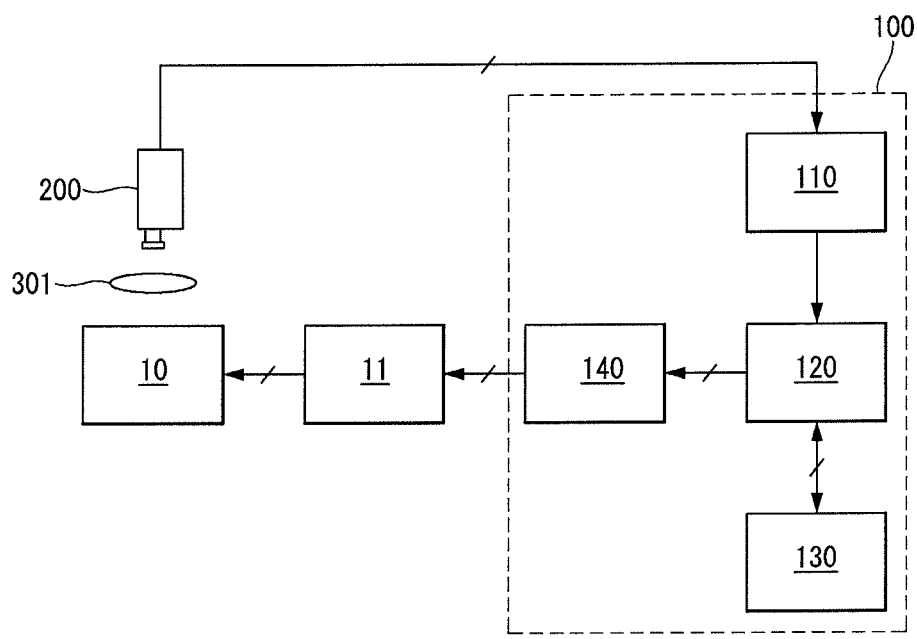
FIG. 3 is a block diagram illustrating in detail the crosstalk evaluation system shown in FIG. 2.

FIGS. 2 and 3 illustrate a crosstalk evaluation system of the stereoscopic image display according to the exemplary embodiment of the invention.

As shown in FIGS. 2 and 3, the crosstalk evaluation system according to the exemplary embodiment of the invention includes the display element 10, a luminance meter 200, and a computer 100.

In the glasses type stereoscopic image display, a left eye filter 301 or a right eye filter 302 of glasses 300 (for example, shutter glasses or polarization glasses) is disposed in front of a light incident unit (or a lens) of the luminance meter 200, so that a luminance is measured under the same environments as the real use environments of the glasses type stereoscopic image display. In the non-glasses type stereoscopic image display, glasses are not disposed in front of the luminance meter 200.

The computer 100 alternately supplies test data of the left/right eye image and test data of the right/left eye image to the display element 10 and calculates a 3D crosstalk at an i-gray level affected by a j-gray level using the following Equations (3) and (4) based on a luminance information received from the luminance meter 200, where i and j are an integer between 0 and 255. The test data of the left/right eye image and the test data of the right/left eye image are generated as data of the i-gray level or data of the j-gray level.

$$CTL_{i,j} = \left| \frac{L_{i,j} - L_{i,i}}{L_{j,i} - L_{i,i}} \right| \times 100[\%] \quad (3)$$

where $CTL_{i,j}$ is a 3D crosstalk at the i-gray level of the left eye image affected by the j-gray level of the right eye image, $L_{i,j}$ is a luminance at the i-gray level of the left eye image affected by the j-gray level of the right eye image, and $L_{j,i}$ is a luminance at the j-gray level of the left eye image affected by the i-gray level of the right eye image.

$$CTR_{i,j} = \left| \frac{R_{i,j} - R_{i,i}}{R_{j,i} - R_{i,i}} \right| \times 100[\%] \quad (4)$$

where $CTR_{i,j}$ is a 3D crosstalk at the i-gray level of the right eye image affected by the j-gray level of the left eye image, $R_{i,j}$ is a luminance at the i-gray level of the right eye image affected by the j-gray level of the left eye image, and $R_{j,i}$ is a luminance at the j-gray level of the right eye image affected by the i-gray level of the left eye image.

Figure 4:
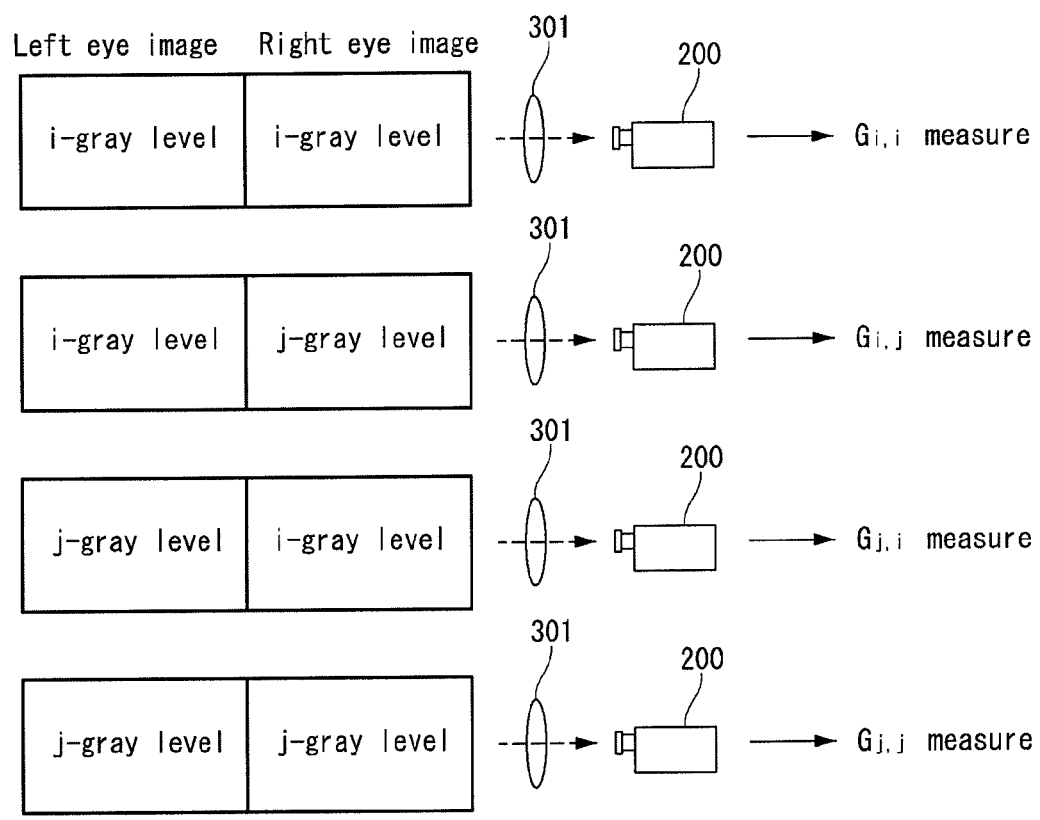
FIG. 4 illustrates a method for measuring a luminance in a glasses type stereoscopic image display according to an exemplary embodiment of the invention.

As shown in FIG. 4, the luminance meter 200 measures the luminances of the left and right eye images each having the i-gray level and the j-gray level. In the glasses type stereoscopic image display, the luminance meter 200 measures the luminance of the left eye image using the left eye filter 301 of the glasses 300 and measures the luminance of the right eye image using the right eye filter 302 of the glasses 300. Further, $G_{i,i}$, $G_{i,j}$, $G_{j,i}$, and $G_{j,j}$, are luminances measured by the luminance meter 200. When the luminance of the left eye image is measured, the 3D crosstalk is calculated using the above Equation (3). When the luminance of the right eye image is measured, the 3D crosstalk is calculated using the above Equation (4).

As shown in FIG. 3, the computer 100 includes an analog-to-digital converter (ADC) 110, a central processing unit (CPU) 120, a memory 130, a graphic processing unit (GPU) 140, and the like.

The ADC 110 converts an analog voltage received from the luminance meter 200 into a digital signal and supplies the digital signal to the CPU 120. The CPU 120 processes data received from an external equipment (not shown) and a user interface (not shown) and controls peripheral units. The CPU 120 analyzes the digital signal received from the ADC 110 and detects the luminances of the left and right eye images. Further, the CPU 120 detects the 3D crosstalk at each of all of the gray levels based on the above Equations (3) and (4). The CPU 120 stores the luminances of the left and right eye images at each of all of the gray levels and the 3D crosstalk at each of all of the gray levels in the memory 130. The GPU 140 supplies the left eye image data and the right eye image data to a display element driving circuit 11 while changing the gray levels of the left eye image data and the gray levels of the right eye image data under the control of the CPU 120.

The display element driving circuit 11 includes a data driving circuit, a scan driving circuit, and a timing controller. When the display element 10 is a liquid crystal display panel, the display element driving circuit 11 further includes a driving circuit of a backlight unit. The data driving circuit supplies the data signal to the data lines of the display element 10. The scan driving circuit sequentially supplies the scan pulse to the scan lines of the display element 10. The timing controller supplies digital video data received from the GPU 140 to the data driving circuit and controls an operation timing of the data driving circuit and an operation timing of the scan driving circuit based on timing signals received from the GPU 140.

Figure 5:
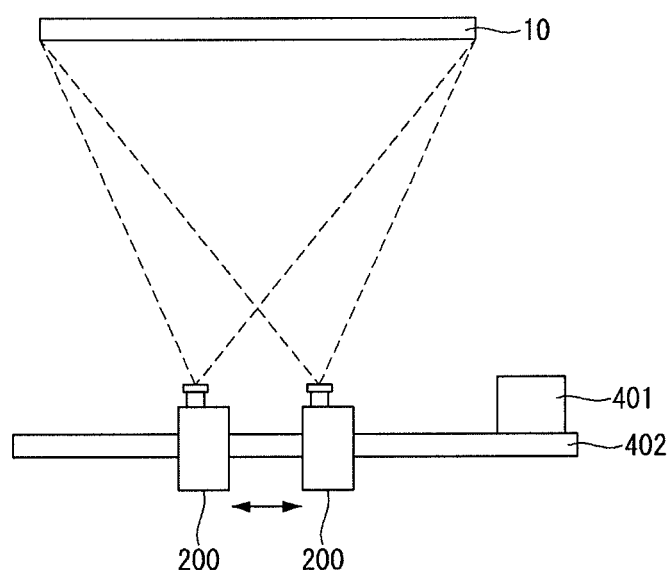
FIG. 5 illustrates a crosstalk evaluation system applied to a non-glasses type stereoscopic image display according to an exemplary embodiment of the invention.

FIG. 5 illustrates the crosstalk evaluation system applied to the non-glasses type stereoscopic image display according to the exemplary embodiment of the invention.

As shown in FIG. 5, the crosstalk evaluation system according to the exemplary embodiment of the invention includes a conveyance system for automatically moving the luminance meter 200. The non-glasses type stereoscopic image display separates a path of light of the left eye image and a path of light of the right eye image using a device such as a parallax barrier and a lenticular lens. Thus, in the non-glasses type stereoscopic image display, the luminance meter 200 senses the luminance of the left eye image and the luminance of the right eye image while moving by a distance between both eyes of the user. For this, the conveyance system includes a power supply unit 401 and a straight guide unit 402. The power supply unit 401 includes a step motor, a gear, a belt pulley, etc. and accurately transfers the straight guide unit 402. The straight guide unit 402 includes an LM guide, etc. and straightly transfers the luminance meter 200 using electric power from the power supply unit 401. The power supply unit 401 is controlled by a program previously set in the CPU 120.

Figure 6:
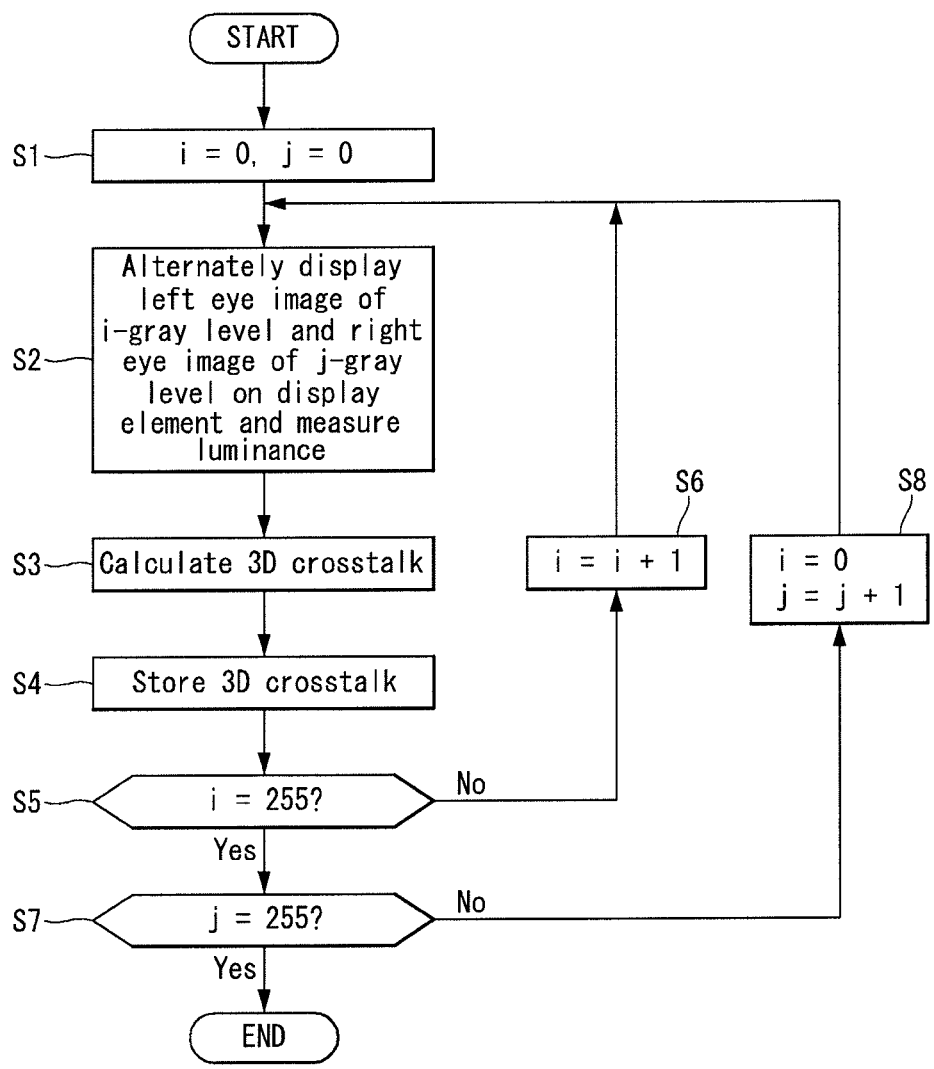
FIG. 6 is a flow chart sequentially illustrating a method for evaluating a crosstalk of a stereoscopic image display according to an exemplary embodiment of the invention.

FIG. 6 is a flow chart sequentially illustrating a method for evaluating the crosstalk of the stereoscopic image display according to the exemplary embodiment of the invention. The crosstalk evaluation method is controlled by the CPU 120.

As shown in FIG. 6, the crosstalk evaluation method according to the exemplary embodiment of the invention initializes both the i-gray level of the left eye image and the j-gray level of the right eye image at the black gray level (i.e., i=0 and j=0) in step S1. The crosstalk evaluation method alternately displays the left and right eye images each having the black gray level on the display element 10 and measures the luminance of the left eye image of the i-gray level using the luminance meter 200 in step S2. Subsequently, the crosstalk evaluation method calculates the 3D crosstalk at the i-gray level of the left eye image affected by the j-gray level of the right eye image based on the above Equation (3) and stores the result of the calculation in the memory 130 in steps S3 and S4. The crosstalk evaluation method repeatedly performs steps S2 to S6 while increasing the i-gray level of the left eye image by one. Hence, the crosstalk evaluation method calculates and stores the 3D crosstalk at each of all of the gray levels of the left eye image affected by the j-gray level of the right eye image.

When the i-gray level of the left eye image reaches a maximum gray level "255", the crosstalk evaluation method calculates and stores the 3D crosstalk at the maximum i-gray level. Subsequently, the crosstalk evaluation method initializes the i-gray level and repeatedly performs steps S2 to S8 while increasing the j-gray level of the right eye image by one, until the j-gray level of the right eye image reaches the maximum gray level "255". Hence, the crosstalk evaluation method calculates and stores the 3D crosstalk at each of all of the gray levels of the left eye image affected by all of the gray levels of the right eye image. In step S8, the crosstalk evaluation method may not increase the j-gray level of the right eye image by one and may increase the j-gray level of the right eye image to 64, 129, 192, and 255 as shown in FIG. 7.

The crosstalk evaluation method at the i-gray level of the right eye image is performed along the flow chart of FIG. 6 in the same manner as the i-gray level of the left eye image. For example, the crosstalk evaluation method according to the exemplary embodiment of the invention repeatedly performs steps S2 to S6 while increasing the i-gray level of the right eye image by one. Hence, the crosstalk evaluation method calculates and stores the 3D crosstalk at each of all of the gray levels of the right eye image affected by the j-gray level of the left eye image. Subsequently, the crosstalk evaluation method initializes the i-gray level of the right eye image and repeatedly performs steps S2 to S8 while increasing the j-gray level of the left eye image by one until the j-gray level of the left eye image reaches the maximum gray level "255". Hence, the crosstalk evaluation method calculates and stores the 3D crosstalk at each of all of the gray levels of the right eye image affected by all of the gray levels of the left eye image.

Figure 7:
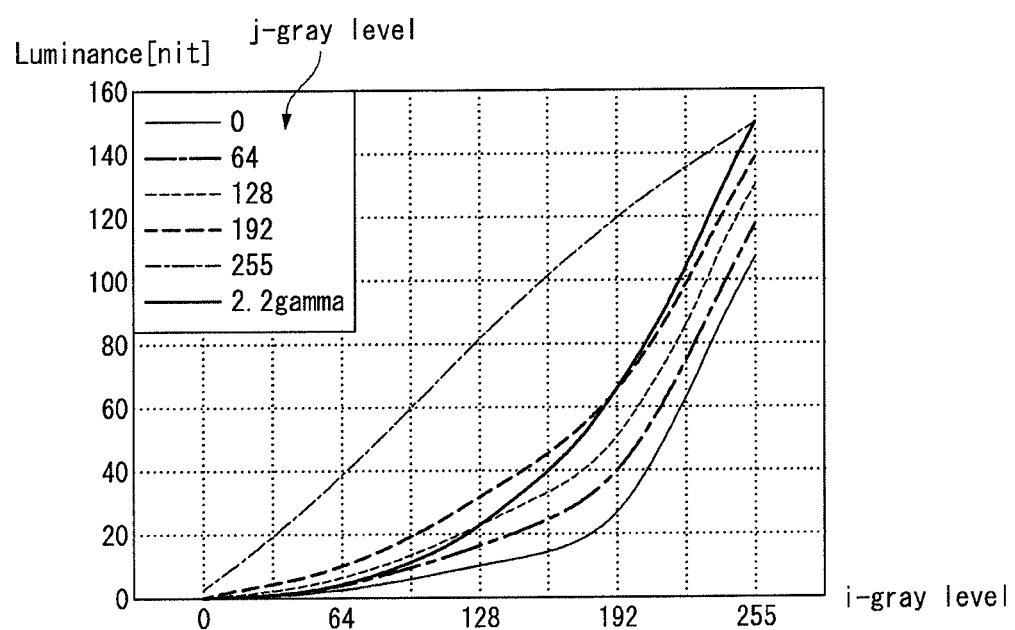
FIG. 7 is a graph illustrating the result of an experiment in which a 3D crosstalk at a gray level of a left or right eye image is measured by a system and a method for evaluating a crosstalk of a stereoscopic image display according to an exemplary embodiment of the invention.

FIG. 7 is a graph illustrating the result of an experiment in which the 3D crosstalk at the gray level of the left/right eye image is measured by the system and the method for evaluating the crosstalk of the stereoscopic image display according to the exemplary embodiment of the invention.

Figure 8:
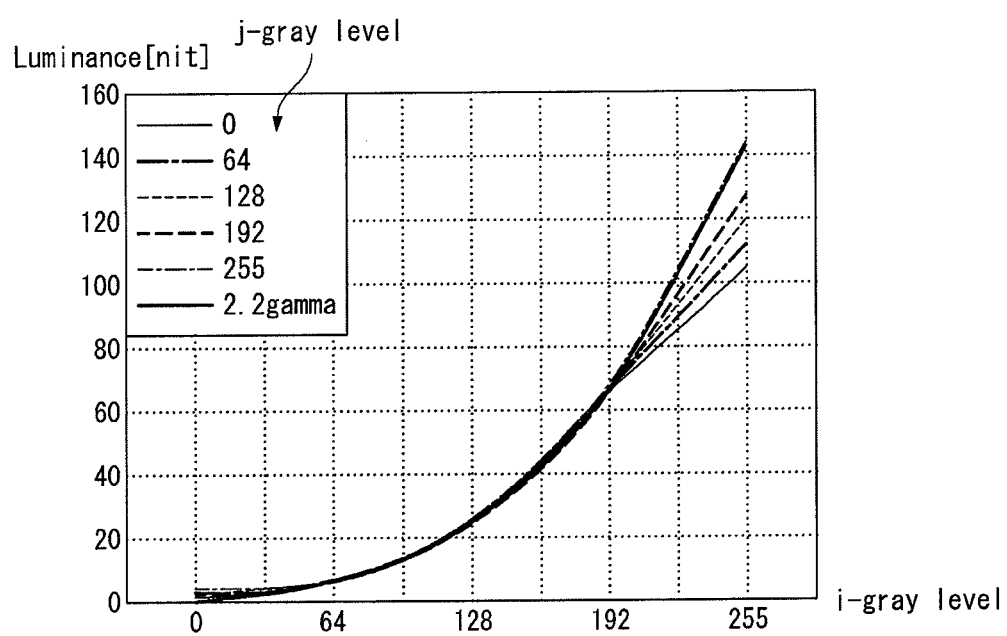
FIG. 8 is a graph illustrating the result of gamma characteristic optimized using an over-driving compensation (ODC) method.

In FIG. 7, the i-gray level is a gray level of the left/right eye image measured by the luminance meter 200, and the j-gray level is a gray level of the right/left eye image displayed during a previous frame period. According to the result of the experiment illustrated in FIG. 7, when the left/right eye image of the i-gray level is displayed, the i-gray level does not meet an optimum gamma curve (for example, 2.2 gamma curve) because of an influence of the j-gray level of the right/left eye image displayed during the previous frame period. Hence, gamma characteristic of the left/right eye image of the i-gray level is distorted. The influence between the i-gray level of the left/right eye image and the j-gray level of the right/left eye image is analyzed based on the result of the experiment of the gamma characteristic, and a compensation value at each of the gray levels is set based on the result of an analysis. The input digital video data is modulated to the previously set compensation values using an over-driving compensation (ODC) method. Hence, a gamma curve of FIG. 8 similar to the optimum gamma curve may be obtained.

As described above, the embodiment of the invention calculates the 3D crosstalk at the i-gray level of the left/right eye image affected by the j-gray level of the right/left eye image while automatically changing the i-gray level and the j-gray level. As a result, the embodiment of the invention may accurately and rapidly calculate the 3D crosstalk at each of all of the representable gray levels.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A crosstalk evaluation system of a stereoscopic image display, the system comprising:
    a display element configured to alternately display left and right eye images each having an i-gray level and a j-gray level, where "i" and "j" are an integer;
    a luminance meter configured to sense luminances of the left and right eye images displayed on the display element; and
    a computer configured to calculate a 3D crosstalk at the i-gray level of the left eye image affected by the j-gray level of the right eye image and a 3D crosstalk at the i-gray level of the right eye image affected by the j-gray level of the left eye image based on a luminance information received from the luminance meter while changing the i-gray level and the j-gray level,
    wherein the 3D crosstalk at the i-gray level of the left eye image affected by the j-gray level of the right eye image and the 3D crosstalk at the i-gray level of the right eye image affected by the j-gray level of the left eye image are calculated based on the following Equations:

$$CTL_{i,j} = \left| \frac{L_{i,j} - L_{i,i}}{L_{j,i} - L_{i,i}} \right| \times 100[\%],$$

$$CTR_{i,j} = \left| \frac{R_{i,j} - R_{i,i}}{R_{j,i} - R_{i,i}} \right| \times 100[\%]$$

where $CTL_{i,j}$ is the 3D crosstalk at the i-gray level of the left eye image affected by the j-gray level of the right eye image, $L_{i,j}$ is a luminance at the i-gray level of the left eye image affected by the j-gray level of the right eye image, $L_{j,i}$ is a luminance at the j-gray level of the left eye image affected by the i-gray level of the right eye image, $CTR_{i,j}$ is the 3D crosstalk at the i-gray level of the right eye image affected by the j-gray level of the left eye image, $R_{i,j}$ is a luminance at the i-gray level of the right eye image affected by the j-gray level of the left eye image, and $R_{j,i}$ is a luminance at the j-gray level of the right eye image affected by the i-gray level of the left eye image.

2. The crosstalk evaluation system of claim 1, wherein a left eye filter or a right eye filter of shutter glasses or polarization glasses is disposed in front of a light incident unit of the luminance meter.

3. The crosstalk evaluation system of claim 1, further comprising:
   a straight guide unit configured to move the luminance meter by a distance between both eyes of a user in front of the display element; and
   a power supply unit configured to drive the straight guide unit.

4. A method for evaluating a crosstalk of a stereoscopic image display, the method comprising:
   alternately displaying left and right eye images each having an i-gray level and a j-gray level on a display element, where "i" and "j" are an integer;
   sensing luminances of the left and right eye images displayed on the display element using a luminance meter disposed in front of the display element; and
   calculating a 3D crosstalk at the i-gray level of the left eye image affected by the j-gray level of the right eye image and a 3D crosstalk at the i-gray level of the right eye image affected by the j-gray level of the left eye image based on a luminance information received from the luminance meter while changing the i-gray level and the j-gray level,
   wherein the 3D crosstalk at the i-gray level of the left eye image affected by the j-gray level of the right eye image and the 3D crosstalk at the i-gray level of the right eye image affected by the j-gray level of the left eye image are calculated based on the following Equations:

$$CTL_{i,j} = \left| \frac{L_{i,j} - L_{i,i}}{L_{j,i} - L_{i,i}} \right| \times 100[\%],$$

$$CTR_{i,j} = \left| \frac{R_{i,j} - R_{i,i}}{R_{j,i} - R_{i,i}} \right| \times 100[\%]$$

where $CTL_{i,j}$ is the 3D crosstalk at the i-gray level of the left eye image affected by the j-gray level of the right eye image, $L_{i,j}$ is a luminance at the i-gray level of the left eye image affected by the j-gray level of the right eye image, $L_{j,i}$ is a luminance at the j-gray level of the left eye image affected by the i-gray level of the right eye image, $CTR_{i,j}$ is the 3D crosstalk at the i-gray level of the right eye image affected by the j-gray level of the left eye image, $R_{i,j}$ is a luminance at the i-gray level of the right eye image affected by the j-gray level of the left eye image, and $R_{j,i}$ is a luminance at the j-gray level of the right eye image affected by the i-gray level of the left eye image.

5. The method of claim 4, further comprising disposing a left eye filter or a right eye filter of shutter glasses or polarization glasses in front of a light incident unit of the luminance meter.

6. The method of claim 4, further comprising driving a straight guide unit, on which the luminance meter is mounted, to move the luminance meter by a distance between both eyes of a user in front of the display element.

* * * * *